US006791954B1

United States Patent
Cheng et al.

(10) Patent No.: US 6,791,954 B1
(45) Date of Patent: Sep. 14, 2004

(54) METHOD FOR ENHANCED POWER CONTROL BY ADAPTIVELY ADJUSTING AN AMOUNT OF CHANGE IN A TARGET SIGNAL-TO-NOISE RATIO

(75) Inventors: Terry Si-Fong Cheng, Randolph, NJ (US); Ching Yao Huang, Randolph, NJ (US); Frances Jiang, Whippany, NJ (US); Alexandro Federico Salvarini, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 892 days.

(21) Appl. No.: 09/592,287

(22) Filed: Jun. 12, 2000

(51) Int. Cl.[7] .................................. H04B 7/05; G08C 17/00
(52) U.S. Cl. ................................. 370/311; 370/318
(58) Field of Search ............................. 370/311, 318, 370/331, 332, 333, 335; 455/522

(56) References Cited

U.S. PATENT DOCUMENTS

| 5,216,692 A | 6/1993 | Ling |
| 5,727,033 A | 3/1998 | Weaver et al. |
| 6,151,508 A * | 11/2000 | Kim et al. ................ 455/522 |
| 6,219,342 B1 * | 4/2001 | Rege ........................ 370/318 |
| 6,434,124 B1 * | 8/2002 | Rege ........................ 370/311 |
| 6,507,572 B1 * | 1/2003 | Kumar et al. ............. 370/335 |

FOREIGN PATENT DOCUMENTS

| EP | 0715423 | 6/1996 |
| EP | 0802638 | 10/1997 |

OTHER PUBLICATIONS

Sampath, Ashwin et al. "On Setting Reverse Link Target SIR in a CDMA System." IEEE 1997, pp. 929–933.
Jack M. Holtzman, "CDMA Power Control for Wireless Networks", in Third Generation Wireless Information Networks, S. Nanda and D. J. Goodman (eds), Kluwer Academic Publishers, Boston, MA 1992.

* cited by examiner

Primary Examiner—Salvatore Cangialosi

(57) ABSTRACT

In the method according to the present invention, a signal from a mobile station is received. The standard deviation of the symbol error rate is determined, and power control with adaptive adjustment of an amount of change in the target signal-to-noise ratio is performed based on the determined standard deviation of the signal error rate and a target associated therewith.

16 Claims, 5 Drawing Sheets

METHOD FOR ENHANCED POWER CONTROL BY ADAPTIVELY ADJUSTING AN AMOUNT OF CHANGE IN A TARGET SIGNAL-TO-NOISE RATIO

BACKGROUND OF THE INVENTION

1. Field of the Invention

The present invention relates to power control in a wireless communication system.

2. Description of Related Art

It is well known that power control is critical for CDMA (code division multiple access) wireless systems such as those based on the IS-95 standard (e.g., see Holtzman, J. M., "CDMA Power Control for Wireless Networks," in *Third Generation Wireless Information Networks*, S. Nanda and D. J. Goodman (eds), Kluwer Academic Publishers, Boston, Mass., 1992; and TIA/EIA/IS-95 Interim Standard, *Mobile Station—Base Station Compatibility Standard for Dual-Mode Wideband Spread Spectrum Cellular System*, Telecommunication Industry Association, July 1993). The ultimate objective of power control in CDMA systems is to achieve a desired speech quality on a particular link at a minimum transmit power level. Without effective power control, a desired level of speech quality cannot be obtained under large system loads, and as a result, the capacity gains expected from a CDMA wireless system will not be realized. This is especially true for the reverse link (uplink) of a CDMA system (i.e., from a mobile station to a base station).

Realizing the importance of power control for the reverse link, the IS-95 standard has provided for a power control scheme known in the art as "inner loop power control." In this scheme, a base-station transmits a 1-bit feedback signal to a mobile station every 1.25 milliseconds (ms). The 1-bit value of this feedback signal is representative of whether an estimate of the instantaneous bit energy to noise density ratio ($E_b/N_0$), which is representative of the signal-to-noise ratio, of the received signal at the base station (transmitted from the mobile station) exceeds, or falls below, a target ratio $E_{bT}/N_{0T}$. Hereinafter, the bit energy to noise density ratio will be referred to as the signal-to-noise ratio.

As noted above, the ultimate objective of a power control scheme in the context of CDMA systems is to achieve a desired speech quality on a particular link at a minimum transmit power level. A simple, quantifiable, measure of the speech quality on a link is the associated frame error rate (FER) on that link. For CDMA systems based on IS-95, the desired speech quality can be said to have been achieved on a link if the FER is at or below a certain level (e.g., 1%). For a given fading environment, the FER is a function of the average $E_b/N_0$ at the receiver. Since, as described above, inner loop power control helps maintain the receiver $E_b/N_0$ close to the target $E_{bT}/N_{0T}$, the FER is, ultimately, determined by the target $E_{bT}/N_{0T}$. Therefore, to achieve the desired speech quality in a given fading environment, the target $E_{bT}/N_{0T}$ needs to be set at a level which is appropriate for that environment. Otherwise, the transmission of one mobile station could interfere with the transmission of another mobile station such that the mobile station interfered with can not be heard by the base station—essentially, reducing the capacity of the base station.

Unfortunately, there is no fixed target $E_{bT}/N_{0T}$ that achieves the desired FER in all fading environments. Therefore, those in the art have developed an adaptive mechanism that adjusts the target $E_{bT}/N_{0T}$ accordingly. This mechanism, referred to hereafter as "Reverse Outer Loop Power Control" (ROLPC) monitors the FER and changes the target $E_{bT}/N_{0T}$ depending on whether the FER is below, or above, a desired threshold. By directly using the FER to drive the target $E_{bT}/N_{0T}$, the current ROLPC achieves its objective very well in reasonably steady fading environment. However, since the FER monitoring processing implicit in this technique is rather slow (with time constants on the order of a couple of seconds), its performance can deteriorate in a dynamic environment with rapidly changing fading characteristics.

As such, in order to improve the speed of the ROLPC, the commonly assigned U.S. Patent Application of Carl Weaver and Wei Peng, entitled "Symbol Error Based Power Control for Mobile Telecommunication System," Ser. No. 08/346800, filed Nov. 30, 1994, describes a symbol error (SE) based technique which potentially improves the performance of ROLPC in a dynamic fading environment. This fixed SE rate (SER) target ROLPC technique, which is based on the premise that the SER and FER are strongly correlated, tries to maintain the SER close to a pre-determined fixed target SER value. Thus, after every frame the associated symbol error count is compared with the target SER and the $E_{bT}/N_{0T}$ target is raised or lowered depending upon whether the symbol error count was above or below the SER target. The updated $E_{bT}/N_{0T}$ target is used to generate inner loop feedback bits during the next frame.

The above-mentioned fixed SER target ROLPC technique uses a fixed SER target for the mean value of the SER. Notwithstanding the performance improvements possible with the above-mentioned fixed SER target ROLPC technique, it has been observed that the correlation between the SER and FER varies across different wireless communications environments. For a given (fixed) SER target, the FERs in different fading environments can differ by an order of magnitude. In other words, the above-mentioned fixed SER target ROLPC technique cannot maintain the FER close to the target in all fading environments. As such, in order to achieve a desired FER, different environments require different SER targets. Commonly assigned, U.S. patent application Ser. Nos. 09/052,696 and 09/052,581 of Rege, entitled "An Adaptive Symbol Error Rate Based Technique for CDMA Reverse Link Outer Loop Power Control," and "A Non-Adaptive Symbol Error Count Based Algorithm for CDMA Reverse Link Outer Loop Power Control," respectively, describe techniques for achieving a desired FER under different fading conditions. Specifically, the adaptive technique describes an adaptive SER based power control scheme that uses the coefficient of variation (or standard deviation) of the symbol error count as a "signature" of the environment for dynamically setting the SER target based on its estimate of the environment.

The alternative, non-adaptive symbol error count based reverse link outer loop power control technique also achieves the desired FER under a variety of fading environments. In particular, this technique sets a target for a second order statistic of the SE count. And, both methods use a comparison of the target with measured value to make changes in the $E_{bT}/N_{0T}$ target; namely, an increase or decrease by a fixed amount. Consequently, achieving improved performance through these types of power control methods may take several iterations because the increase and decrease in the $E_{bT}/N_{0T}$ target occur in fixed amounts.

SUMMARY OF THE INVENTION

The method according to the present invention provides for enhanced power control by adaptively adjusting an amount of change in a target signal-to-noise ratio. In a power control technique modified according to the present invention, the amount by which the target signal-to-noise ratio changes is a function of the standard deviation of the symbol error rate (SER), and more particularly, the difference between the standard deviation of the SER and a target standard deviation of the SER.

In one embodiment, adaptively changing the target signal-to-noise ratio is triggered by the updating of a frame error rate (FER). However, in another embodiment, as the standard deviation of the SER is updated, which occurs much more quickly than the updating of the FER, the target signal-to-noise ratio is changed. In both embodiments, when the communication quality indicated by the standard deviation of the SER and the target of the standard deviation of the SER differs from the communication quality indicated by the FER, the target standard deviation of the SER is updated so that the two quality indicators become more consistent.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
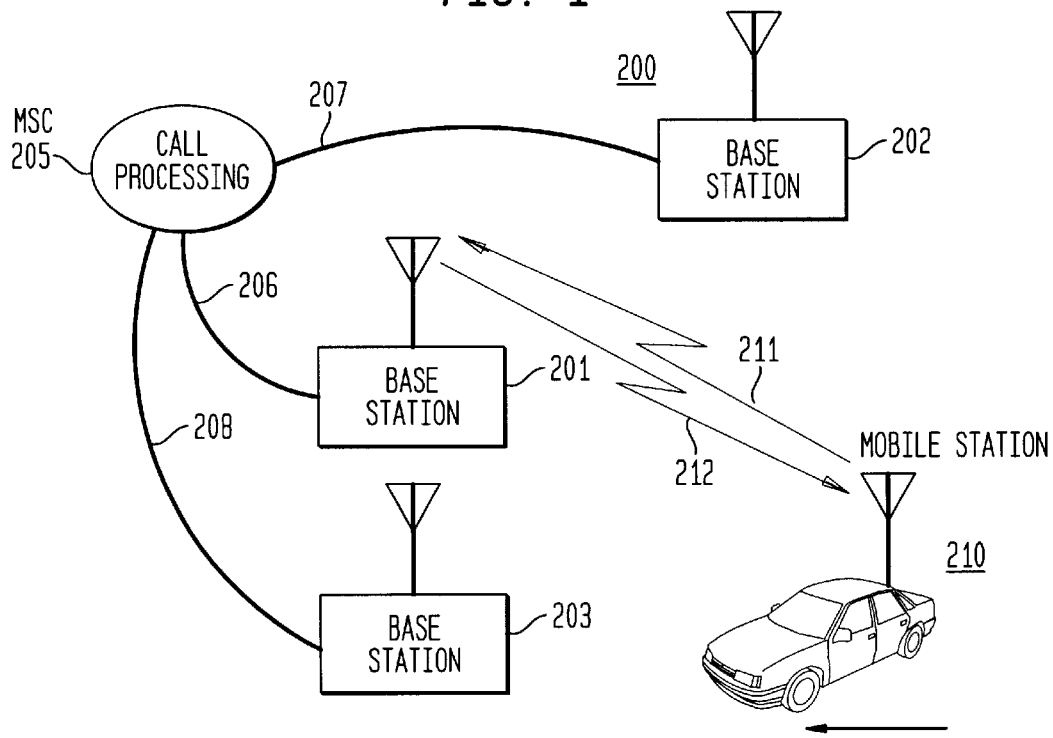
FIG. 1 illustrates a portion of a mobile communication system embodying the principles of the invention.

FIG. 1 illustrates a portion of a CDMA mobile communications system 200 embodying the principles of the invention. Other than the inventive concept, the elements shown in FIG. 1 are well-known and will not be described in detail. For example, although shown as a single block element, base station 201 includes stored-program-control processors, memory, and appropriate interface cards. Except as noted below, and for the purposes of description only, it is assumed that the CDMA mobile communications system conforms to industry standard IS-95. However, it will be appreciated from the following disclosure that the present invention is also applicable to other industry standards such as CDMA 2000, etc. The system 200 includes a mobile switching center (MSC 205), which (among other things) provides call processing; three base stations: 201, 202, and 203; and a mobile station 210, which is illustratively represented by a vehicle icon. The three base stations 201, 202 and 203 and the mobile station 210 are representative of wireless endpoints. Each of the base stations 201, 202 and 203 is coupled to the MSC 205 over respective land-line facilities, 206, 207 and 208. For the purposes of the remainder of this description, it is assumed that the mobile station 210 is in communications with the base station 201, via a downlink signal 212, and an uplink signal 211.

Figure 2:
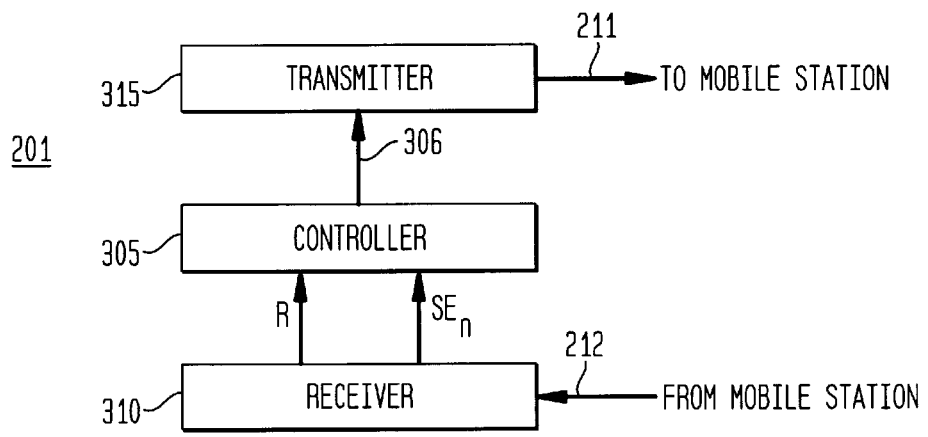
FIG. 2 illustrates a portion of a base station embodying the principles of the invention.

In accordance with the inventive concept, the base station 201 performs reverse outer loop power control (ROLPC) on the received signal 211 from the mobile station 210. FIG. 2 shows a portion of the base station 201 embodying the principles of the invention. Other than the inventive concept, the elements shown in FIG. 2 are well-known and will not be described in detail. For example, a controller 305 is representative of a stored-program-controlled processor with associated memory as known in the art. Also, only that portion of the base station 201 related to the inventive concept is shown, e.g., other processing by a receiver 310 of the received signal is not described. The base station 201 includes the controller 305 (also referred to herein as the base station processor), the receiver 310, and a transmitter 315. The receiver 310 receives the uplink signal 211, and provides to the controller 305 two signals: R, which is the reciprocal of the rate of the frame just processed by the receiver 310 and is equal to 0 if there is an erasure so that the rate information is lost; and $SE_n$, which is the symbol error count generated by the $n^{th}$ frame.

In association with one of the above-identified or a well-known ROLPC technique, the controller 305 updates the signal-to-noise ratio target. The controller 305 also controls the transmitter 315 to provide the above-mentioned feedback signal to mobile station 210 for controlling the transmit signal level of the mobile station 210.

Next the operation of the controller 305 in updating the signal-to-noise ratio target will be described in detail with respect to FIGS. 3A–3B and 4A–4B. More specifically, only the adaptive adjustment of the target signal-to-noise ratio according to embodiments of the invention will be described because the present invention can be associated with any well-known ROLPC technique or the above-identified ROLPC techniques of application Ser. Nos. 09/052,696 and 09/052,581, hereby incorporated by reference in their entirety.

In describing the embodiment of the present invention, the following definitions are used:

$E_b/N_0$=the signal-to-noise ratio (note, as described above, $E_b/N_0$ is the instantaneous bit energy to noise density ratio, which is representative of the signal-to-noise ratio and referred to as such hereinafter);

SE=the symbol error count;

FE=the frame error count;

SER=the symbol error rate;

FER=the frame error rate;

$\sigma$=the standard deviation of the SER=(variance (SER))$^{1/2}$;

$\sigma_{target}$=the target standard deviation of the SER;

$\delta = \sigma - \sigma_{target}$;

$\eta_{up}(\delta)$=up scaling factor as function of $\delta$;

$\eta_{down}(\delta)$=down scaling factor as a function of $\delta$;

$\Delta_{up}$(FER)=up adjustment step as a function of an acceptable FER;

$\Delta_{down}$(FER)=down adjustment step as a function of an acceptable FER;

$\Delta_{SER}$(FER)=an adjustment step as a function of an acceptable FER;

$E_b/N_0$=the signal-to-noise ratio target for reverse inner loop power control;

$\Omega_{up}$=up self-healing correction amount for $\sigma_{target}$;

$\Omega_{down}$=down self-healing correction amount for $\sigma_{target}$;

n=current frame.

As will become apparent from the embodiment of the present invention described below with respect to FIGS. 3A and 3B, the up and down scaling factors $\eta_{up}(\delta)$ and $\eta_{down}(\delta)$ are designed to correct errors in the target signal-to-noise ratio. In this embodiment, $\eta_{up}(\delta)=\eta_{down}(\delta)=|\delta|$, but the present invention is not limited to having $\eta_{up}(\delta)=\eta_{down}(\delta)$ or limited to this function of $\delta$. Instead other functions of $\delta$ can be devised depending on the implementation.

Furthermore, as described above, the up, down and SER adjustment steps $\Delta_{up}$, $\Delta_{down}$ and $\Delta_{SER}$ depend on the acceptable or desired FER. Table 1 below provides an example of the values of the up, down and SER adjustment steps $\Delta_{up}$, $\Delta_{down}$ and $\Delta_{SER}$ for different acceptable FER values.

| Acceptable FER | 1% | 2% | 3% | 4% | 5% |
|---|---|---|---|---|---|
| $\Delta_{up}$ | 3 dB | 2.5 dB | 2 dB | 1.5 dB | 1 dB |
| $\Delta_{down}$ | 1 dB | 1.5 dB | 2 dB | 2.5 dB | 3 dB |
| $\Delta_{SER}$ | 0.5 | 0.5 | 0.5 | 0.5 | 0.5 |

It will be appreciated from the description of the embodiment that the present invention is not limited to these values, and the table of values can be expanded for other acceptable FER values.

Figure 3A:
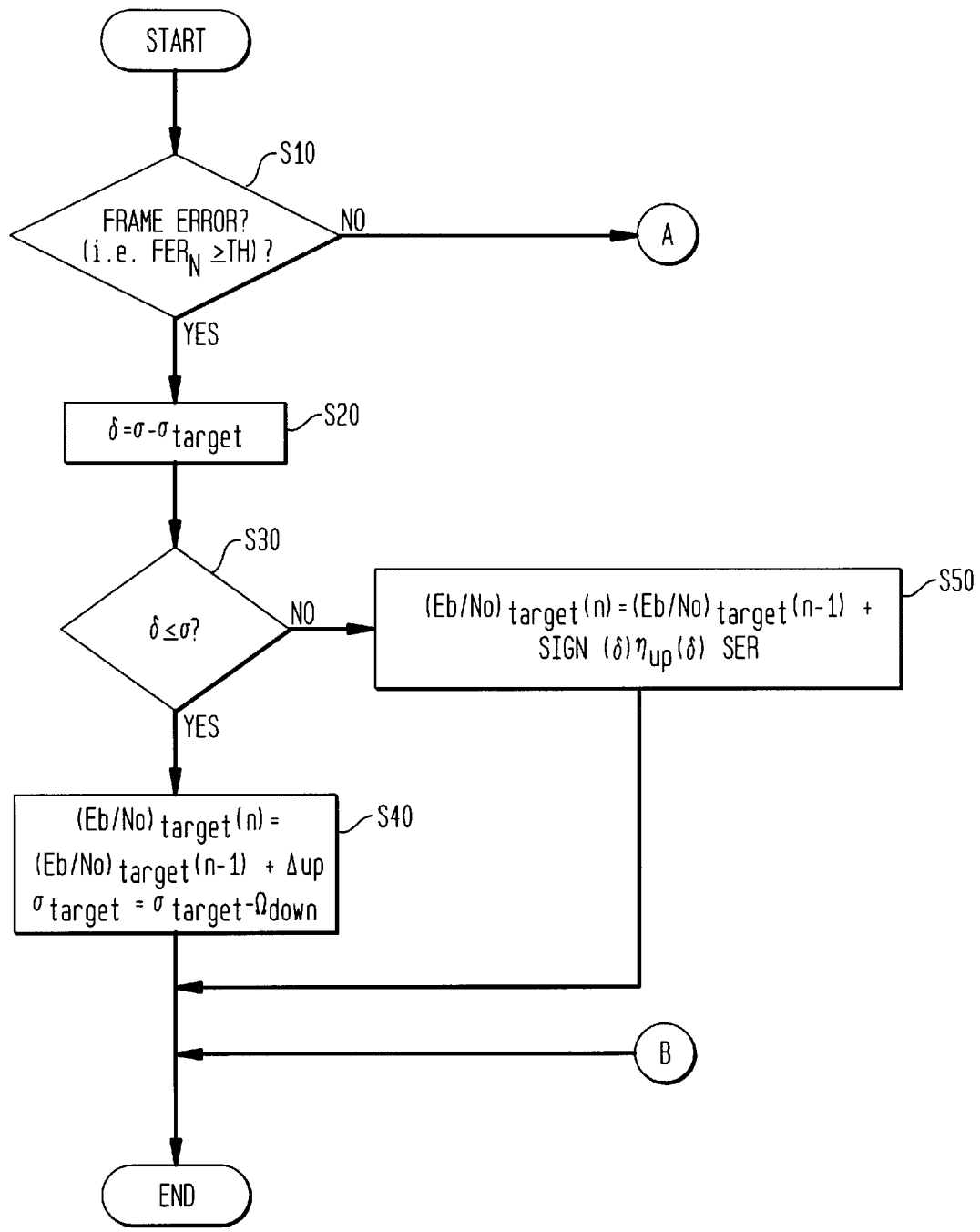
FIGS. 3A–3B illustrate one embodiment of the method according to the present invention.
Figure 3B:
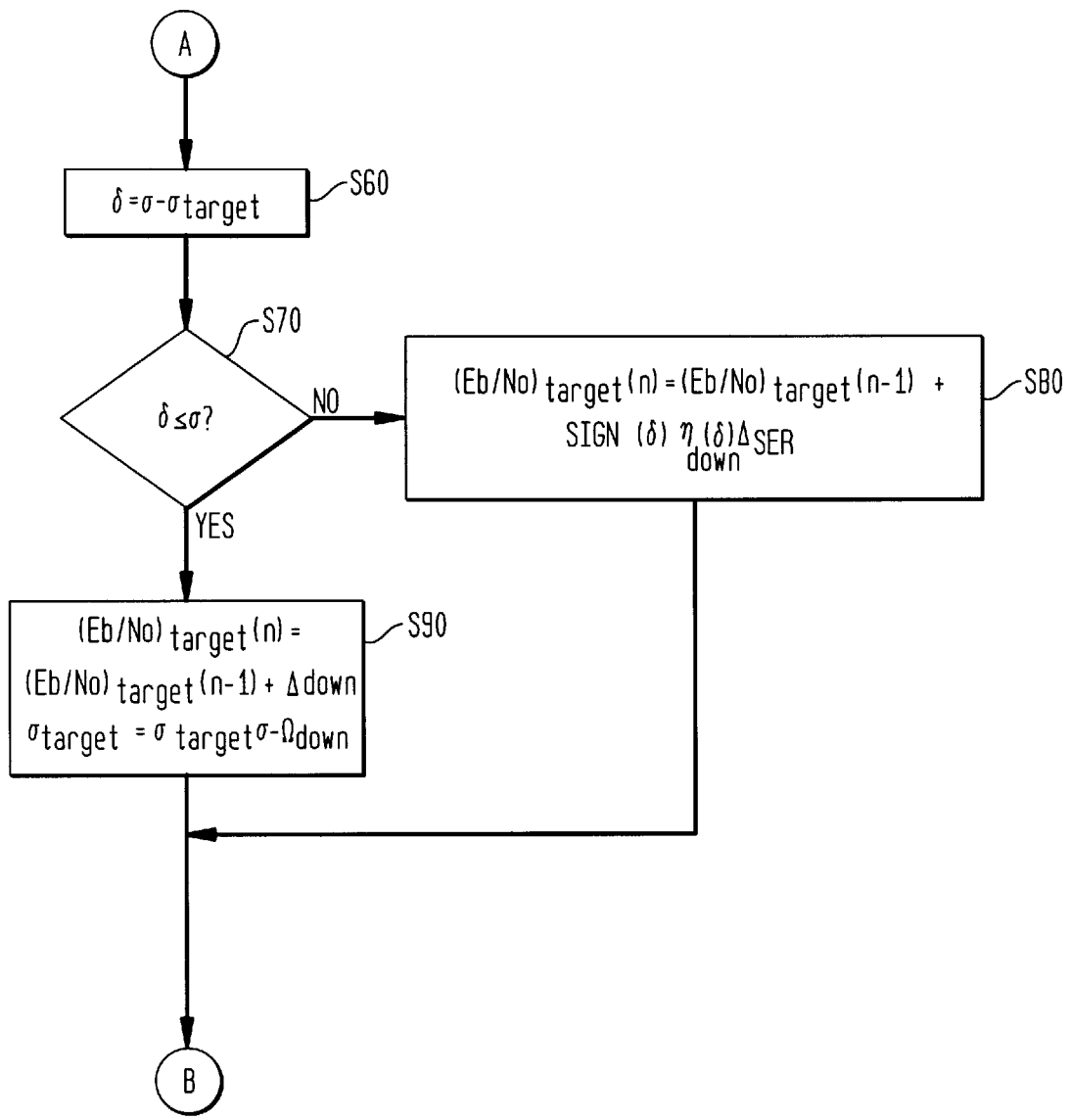
Figure 5:
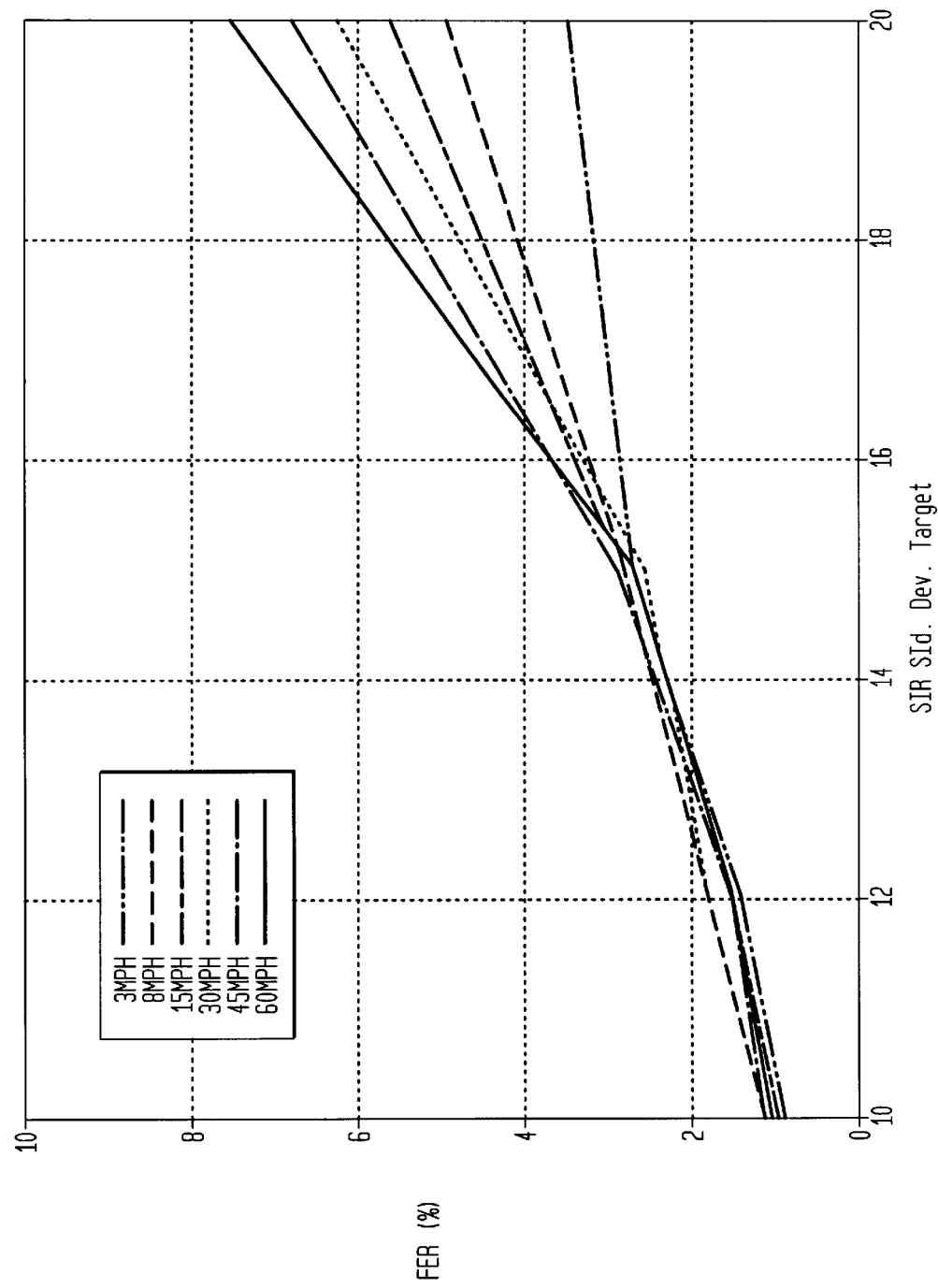
FIG. 5 illustrates a graph of initial target standard deviations of the symbol error rates for mobile stations traveling at different speeds versus the expected resulting frame error rates.

A first embodiment of the present invention is illustrated in FIGS. 3A–3B. As shown in FIG. 3A, in step S10, the controller 305 determines if the FER of the current (i.e., nth) frame exceeds the desired or acceptable frame error rate set by the system designer (e.g., 1%). If so, then in step S20, the controller 305 calculates the difference $\delta$ between the standard deviation of the SER, $\sigma$, and the target of the standard deviation of the SER, $\sigma_{target}$. The 10 target standard deviation is initially established based on the acceptable FER according to the plot shown in FIG. 5. FIG. 5 illustrates a graph of initial standard deviations of the SER for mobile stations travelling at different speeds versus the expected resulting FERs. Accordingly, for example, if the acceptable FER is set at 2%, then the initial target standard deviation of the SER would be set at ~12 because this should result in an FER$\leq$2% regardless of the mobile station's speed. Next, in step S30, the controller 305 determines if the difference $\delta$ is less than or equal to 0. Namely, the difference a represents the communication quality based on the standard deviation of the SER. Because the FER indicates unacceptable communication quality, then the difference $\delta$ should also indicate unacceptable communication quality, which means that $\delta$ should be greater than 0. Consequently, when the difference $\delta$ indicates acceptable communication quality ($\delta \leq 0$), processing proceeds to step S40. In step S40, the target signal-to-noise ratio is updated according to equation (1) shown below and the target standard deviation of the SER, $\sigma_{target}$, is updated as shown in equation (2) below.

$$(E_{bT}/N_{0T})(n)=(E_{bT}/N_{0T})(n-1)+\Delta_{up} \quad (1)$$

$$\sigma_{target}=\sigma_{target}-\Omega_{down} \quad (2)$$

Because, according to the FER, the communication quality is unacceptable, the target signal-to-noise ratio is increased by $\Delta_{up}$.

Also, because the FER is the more accurate indication of communication quality, when the communication quality indicated by the difference $\delta$ is inconsistent therewith, a self-correction of the difference $\delta$ takes place by decreasing the target standard deviation of the SER by the down self-healing correction amount $\Omega_{down}$. (e.g. 0.5, however, the value of $\Omega_{down}$ is a matter of design choice).

After step S40, processing ends until the next FER is received and processing begins at step S10.

Returning to step S30, if the communication quality indicated by the difference $\delta$ is consistent with that of the FER, (i.e., unacceptable communication quality ($\delta \geq 0$)), processing proceeds to step S50. In step S50, the target signal-to-noise ratio is changed in accordance with equation (3) below:

$$(E_{bT}/N_{0T})(n)=(E_{bT}/N_{0T})(n-1)+\text{sign}(\delta)\eta_{up}(\delta)\Delta_{SER} \quad (3)$$

Because communication quality is unacceptable, the target signal-to-noise ratio is increased by an amount of sign$(\delta)\eta_{up}(\delta)\Delta_{SER}$ (note that sign$(\delta)$ is positive). And, because the value of $\eta_{up}(\delta)$ varies as a function of the difference $\delta$, the amount of the increase in the signal-to-noise ratio is an adaptive adjustment.

Returning to step S10, if the FER indicates acceptable communication quality (e.g., less than 1%), then processing proceeds to step S60 as shown in FIG. 3B. In step S60, the difference 6 is calculated in the same manner as described above with respect to S20. Then, in step S70, the controller 305 determines if communication quality indicated by the difference $\delta$ is in agreement with that of the FER. Namely, the FER indicates acceptable communication quality, and as discussed above, when the difference $\delta$ is less than 0, the difference $\delta$ also indicates acceptable communication quality. Consequently, if the difference $\delta$ is less than 0 in step S70, then in step S80, the target signal-to-noise ratio is decreased according to equation (4) (note that sign$(\delta)$ is negative) below.

$$(E_{bT}/N_{0T})(n)=(E_{bT}/N_{0T})(n-1)+\text{sign}(\delta)\eta_{down}(\delta)\Delta_{SER} \quad (4)$$

Because the communication quality is acceptable, the target signal-to-noise ratio can be reduced. As shown by equation (4), the target signal-to-noise ratio is reduced by the amount sign$(\delta)\eta_{down}(\delta)\Delta_{SER}$. And, because the value of $\eta_{down}(\delta)$ varies as a function of the difference $\delta$, the amount of the decrease in the signal-to-noise ratio is an adaptive adjustment.

If in step S70, the difference $\delta$ indicates unacceptable communication quality ($\delta \geq 0$), which is inconsistent with the communication quality indicated by the FER, processing proceeds to step S90. In step S90, the target signal-to-noise ratio is decreased according to equation (5) below, and the target standard deviation of the SER is increased according to equation (6) below:

$$(E_{bT}/N_{0T})(n)=(E_{bT}/N_{0T})(n-1)+\Delta_{down} \quad (5)$$

$$\sigma_{target}=\sigma_{target}+\Omega_{up} \quad (6)$$

Because the communication quality is acceptable, the target signal-to-noise ratio can be reduced according to equation (5). Specifically, the target signal-to-noise ratio is reduced by the amount $\Delta_{down}$. Furthermore, because the level of communication quality indicated by the difference $\delta$ is inconsistent with the more accurate quality indication based on the FER, the target standard deviation of the SER is increased by the self-correction amount $\Omega$ (e.g., 0.5) so that the quality indicated by the difference $\delta$ becomes more consistent with that indicated by the FER. As with $\Omega_{down}$, the value of $\Omega_{up}$ is a matter of design choice.

After step S80 or step S90, processing ends until the next frame error measurement, wherein processing begins again in step S10.

As demonstrated above, the adaptive adjustment of the target signal-to-noise ratio is triggered by the FER, which is generated once every frame, approximately every 20 msec. However, the amount of adjustment to the target signal-to-noise ratio is based on the SER, and more particularly, the standard deviation of the SER and the target therefore. Furthermore, the target standard deviation of the SER is adaptively corrected based on the accurate quality indication of the FER. Because of the adaptive adjustment of the target signal-to-noise ratio, a wireless system incorporating the method according to the present invention can more quickly adapt to dynamic environments, and provide a higher level of communication quality in such environments.

Figure 4A:
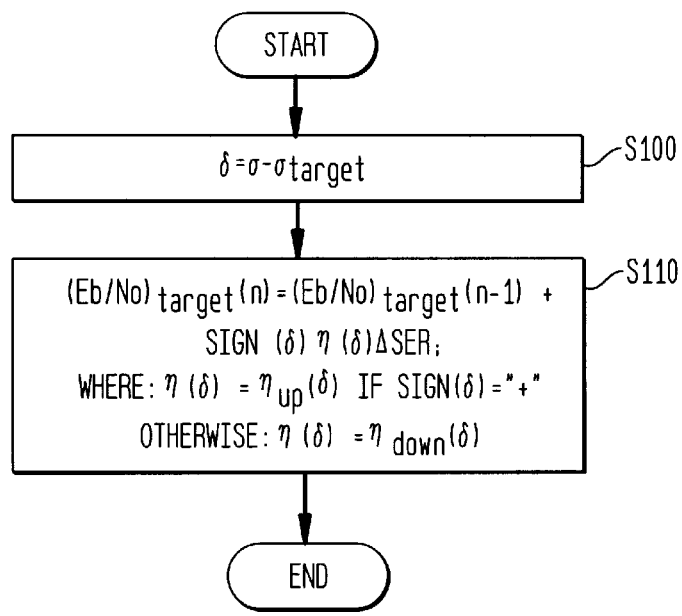
FIGS. 4A–4B illustrate another embodiment of the method according to the present invention.
Figure 4B:
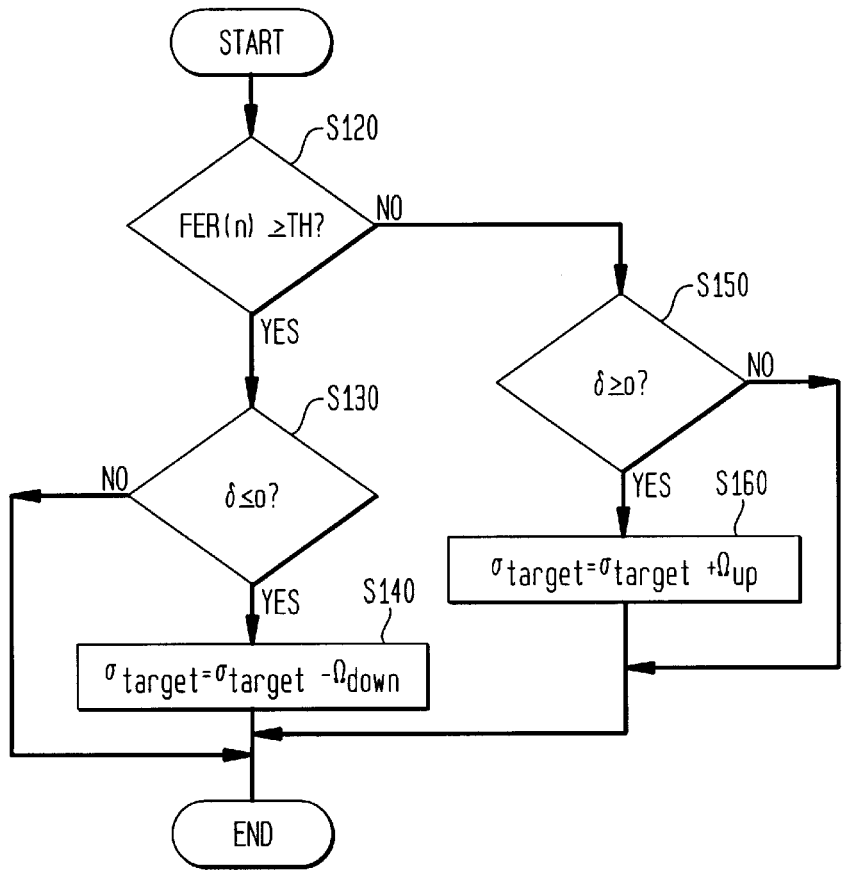

FIGS. 4A–4B illustrate another embodiment for adaptively adjusting an amount of change in the target signal-to-noise ratio according to the present invention. As discussed above, the FER is generated once each frame, approximately every 20 msec. The SER, and therefore the standard deviation of the SER, are generated in significantly less time than 20 msec (e.g., 1–5 msec). According to the second embodiment, the target signal-to-noise ratio is adaptively changed according to the flowchart shown in FIG. 4A.

As shown in FIG. 4A, in step S100, the controller 305 calculates the difference δ in the same manner as discussed previously with respect to step S20 in FIG. 3A. Then, in step S110, the controller updates the target signal-to-noise ratio according to an equation substantially the same as equation (3) and (4) discussed with respect to steps S50 and S80 in FIGS. 3A and 3B, except that $\eta_{down}(\delta)$ and $\eta_{up}(\delta)$ respectively have been replaced by a single adaptive adjustment h(δ). Adaptive adjustment variable $\eta(\delta)=\eta_{up}(\delta)$ when sign (δ) is positive; otherwise, $\eta(\delta)=\eta_{down}(\delta)$.

Because the standard deviation of the SER changes more quickly than 20 msec, the method of adaptively changing the target signal-to-noise ratio according to this embodiment adapts to a dynamically changing environment even more quickly than the method described above with respect to FIGS. 3A and 3B.

In conjunction with adaptively changing the target signal-to-noise ratio shown in FIG. 4A, the method according to this second embodiment also performs the self-correcting operation illustrated in FIG. 4B every 20 msec when the FER is generated. As shown in FIG. 4B, in step S120, the controller determines if the FER is greater than or equal to the desired FER. If the FER is greater than the desired FER, indicating unacceptable communication quality, then in step S130 it is determined if the current difference δ from step S100 of FIG. 4A is consistent or inconsistent with this quality determination. Namely, if the difference δ is less than or equal to 0, then the difference δ indicates acceptable communication quality and is inconsistent with the quality indication from the FER. As a result, in step S140, the controller 305 decreases the target standard deviation of the SER by the self-correction amount $\Omega_{down}$.

If in step S130, the difference δ indicates unacceptable communication quality (δ≧0), then processing ends until the next FER is generated.

Returning to step S120, if the FER is less than the desired FER, then the communication quality is acceptable, and processing proceeds from step S120 to step S150. In step S150, the controller 305 determines if the difference δ indicates acceptable communication quality as well. Namely, the controller 30 determines if the difference δ is greater than or equal to 0. If the difference δ is greater than or equal to 0, then the difference δ indicates unacceptable communication quality, and is inconsistent with the quality determination based on the FER. As a result, the controller in step S160 will increase the target standard deviation for the SER by the self-correction amount $\Omega_{up}$, and processing ends until the next FER is generated.

In step S150, if the difference δ indicates acceptable communication quality consistent with the determination based on the FER, then processing ends until the next FER is generated.

The method according to the second embodiment allows the target signal-to-noise ratio to be adjusted at a much quicker rate than that of the first embodiment, and also provides for a self-correcting mechanism when the quality of communication indicated by the SER is inconsistent with that indicated by the more accurate FER measurement.

Unlike other ROLPC techniques, ROLPC techniques modified in accordance with the present invention provide for improved adaptive adjustment to the target signal-to-noise ratio. As such, the present invention provides for improved power control in rapidly or dynamically changing environments.

Furthermore, while the present invention has been described with respect to reverse link power control, it will be appreciated that the present invention is also applicable to forward link power control in systems or standards (e.g., CDMA 2000) permitting a similar type of power control on the forward link.

Also, although the present invention has been described with respect to CDMA, it should be understood that the present invention is not limited to CDMA. Instead the present invention is applicable to the reverse and/or forward link power control of other communication methodologies permitting a similar type of power control.

The invention being thus described, it will be obvious that the same may be varied in many ways. Such variations are not to be regarded as a departure from the spirit and scope of the invention, and all such modifications are intended to be included within the scope of the following claims.

We claim:

1. A method for use in a wireless infrastructure, comprising:
   receiving a signal from a transmitting device;
   determining symbol error rates based on said received signal; and
   performing reverse outer loop power control with adaptive adjustment of an amount of change in a target signal-to-noise ratio, said adaptive adjustment based on said symbol error rates.

2. The method of claim 1, wherein said adaptive adjustment is based on said symbol error rates and a target associated with said symbol error rates.

3. The method of claim 1, wherein said adaptive adjustment is triggered by determination of a frame error rate.

4. The method of claim 1, further comprising:
   determining frame error rates based on said received signal; and wherein
   said adaptive adjustment adjusts said target signal-to-noise ratio by an amount based on said frame error rates and said symbol error rates.

5. The method of claim 1, further comprising:
   determining frame error rates from said received signal;
   determining whether to increase or decrease said target signal-to-noise ratio based on said frame error rates; and
   determining an amount to increase or decrease said target signal-to-noise ratio based on said symbol error rates.

6. A method for use in a wireless infrastructure, comprising:
   receiving a signal from a transmitting device;
   first determining a standard deviation of a symbol error rates based on said received signal; and performing power control with adaptive adjustment of an amount of change in a target signal-to-noise ratio based on said standard deviation of said symbol error rates.

7. The method of claim 6, wherein said adaptive adjustment adjusts said target signal-to-noise ratio by an amount based on said standard deviation of said symbol error rates and a target standard deviation of said symbol error rates.

8. The method of claim 7, further comprising:
second determining frame error rates from said received signal; and
third determining whether to increase or decrease said target standard deviation of said symbol error rates based on said frame error rates.

9. The method of claim 8, wherein said third determining step comprises:
fourth determining if communication quality is acceptable based on said frame error rates;
fifth determining if communication quality is acceptable based on said standard deviation of said symbol error rates and said target standard deviation of said symbol error rates; and
decreasing said target standard deviation of said symbol error rates if said output of said fourth determining step indicates unacceptable communication quality and said output of said fifth determining step indicates acceptable communication quality; and
increasing said target standard deviation of said symbol error rates if said output of said fourth determining step indicates unacceptable communication quality and said output of said fifth determining step indicates acceptable communication quality.

10. The method of claim 9, further comprising:
first determining if communication quality is acceptable based on said frame error rates;
second determining if communication quality is acceptable based on said standard deviation of said symbol error rates and said target standard deviation of said symbol error rates; and
adjusting said target standard deviation of said symbol error rates consistent with output of said first determining step when said output of said first determining step and output of said second determining step are inconsistent.

11. The method of claim 6, further comprising:
determining frame error rates based on said received signal; and wherein
said adaptive adjustment adjusts said target signal-to-noise ratio by an amount based on said frame error rates, said standard deviation of said symbol error rates, and a target standard deviation of said symbol error rates.

12. The method of claim 6, further comprising:
determining frame error rates based on said received signal; and wherein said performing step includes,
first determining if communication quality is acceptable based on a frame error rates,
second determining if communication quality is acceptable based on said standard deviation of said symbol error rates and a target standard deviation of said symbol error rates,
increasing said target signal-to-noise ratio by a first amount if said output of said first determining step indicates unacceptable communication quality and said output of said second determining step indicates acceptable communication quality,
increasing said target signal-to-noise ratio by a second amount, which is based on said standard deviation of said symbol error rates and said target standard deviation of said symbol error rates, if said output of said first determining step indicates unacceptable communication quality and said output of said second determining step indicates unacceptable communication quality,
decreasing said target signal-to-noise ratio by a third amount if said output of said first determining step indicates acceptable communication quality and said output of said second determining step indicates unacceptable communication quality, and
decreasing said target signal-to-noise ratio by a fourth amount, which is based on said standard deviation of said symbol error rates and said target standard deviation of said symbol error rates, if said output of said first determining step indicates acceptable communication quality and said output of said second determining step indicates acceptable communication quality.

13. The method of claim 12, further comprising:
decreasing said target standard deviation of said symbol error rates if said output of said first determining step indicates unacceptable communication quality and said output of said second determining step indicates acceptable communication quality; and
increasing said target standard deviation of said symbol error rates if said output of said first determining step indicates unacceptable communication quality and said output of said second determining step indicates acceptable communication quality.

14. A method for use in a wireless infrastructure, comprising:
receiving a signal from a transmitting device; and
performing power control which is triggered by determination of frame error rates and which adaptively adjusts a target signal-to-noise ratio based on determined symbol error rates, said frame error rates and said symbol error rates determined based on said received signal.

15. The method of claim 14, wherein said performing step comprises:
determining said frame error rates and symbol error rates from said received signal;
determining a standard deviation of said symbol error rates; and
adaptively adjusting a target signal-to-noise ratio based on said standard deviation of said symbol error rates.

16. The method of claim 15, wherein said performing step comprises:
determining a frame error rates and a symbol error rates from said received signal;
determining whether to increase or decrease said target signal-to-noise ratio based on said frame error rates; and
determining an amount to increase or decrease said target signal-to-noise ratio based on said symbol error rates.

* * * * *